United States Patent
Taffin et al.

(10) Patent No.: US 6,360,155 B1
(45) Date of Patent: Mar. 19, 2002

(54) METHOD FOR CONTROLLING AUTOMATIC TRANSMISSION DOWNSHIFT PHASES

(75) Inventors: Christian Taffin, Chatou; Robert Mestres, Saint Sambre, both of (FR)

(73) Assignees: Renault, Boulogne Billancourt; Automobiles Peugeot, Paris; Automobiles Citroen, Neuilly, all of (FR)

( * ) Notice: Subject to any disclaimer, the term of this patent is extended or adjusted under 35 U.S.C. 154(b) by 0 days.

(21) Appl. No.: 09/463,956

(22) PCT Filed: Jun. 26, 1998

(86) PCT No.: PCT/FR98/01360

§ 371 Date: Feb. 9, 2000

§ 102(e) Date: Feb. 9, 2000

(87) PCT Pub. No.: WO99/01684

PCT Pub. Date: Jan. 14, 1999

(30) Foreign Application Priority Data

Jul. 2, 1997 (FR) .............................. 97 08325

(51) Int. Cl.$^7$ .............................. G06F 7/00; B60K 41/04
(52) U.S. Cl. .............................. 701/57; 701/51; 701/64; 477/34
(58) Field of Search .............................. 701/51, 52, 56, 701/57, 61, 62, 64; 477/107, 115, 34, 120, 148

(56) References Cited

PUBLICATIONS

U.S. application No. 09/463,955, filed Feb. 9, 2000.
U.S. application No. 09/463,956, filed Feb. 9, 2000.

*Primary Examiner*—Yonel Beaulieu
(74) *Attorney, Agent, or Firm*—Oblon, Spivak, McClelland, Maier & Neustadt, P.C.

(57) ABSTRACT

A method for controlling automatic transmission downshift phases. The method determines conditions in which the downshift passes from normal operating conditions based on predetermined passage laws to special downshift operating conditions, and senses the passage to the special operating conditions. On sensing the passage to the special operating conditions, downshifting is effectuated by passing from the current gear ratio to a lower gear ratio, and blocking the lower gear ratio until the special downshift operating conditions disappear.

9 Claims, 3 Drawing Sheets

| DRIVER PROGRAM | ECO | | ECO | | MEDIUM | | MEDIUM | | SPORT | | SPORT | |
|---|---|---|---|---|---|---|---|---|---|---|---|---|
| FORCE_DIFF | NEGATIVE | | OTHER | | NEGATIVE | | OTHER | | NEGATIVE | | OTHER | |
| $\delta_{veh}$ LOW | MEDIUM | | LOW | | MEDIUM | | LOW | | MEDIUM | | MEDIUM | |
| | LONG | | LONG | | MEDIUM | | MEDIUM | | MEDIUM | | SHORT | |
| $\delta_{veh}$ MEDIUM | MEDIUM | | MEDIUM | | MEDIUM (A) | | MEDIUM | | HIGH | | HIGH | |
| | MEDIUM | | MEDIUM | | MEDIUM | | SHORT | | MEDIUM | | SHORT | |
| $\delta_{veh}$ HIGH | HIGH | | HIGH | | HIGH | | HIGH | | HIGH | | HIGH | |
| | MEDIUM | | SHORT | | SHORT | | SHORT | | SHORT | | SHORT | |

| n_turb_max |
|---|
| TIME BRAKING |

*FIG. 3*

METHOD FOR CONTROLLING AUTOMATIC TRANSMISSION DOWNSHIFT PHASES

BACKGROUND OF THE INVENTION

Field of the Invention

The invention relates to vehicle automatic transmissions with multi-stage gear ratios. More precisely, it relates to a process for control of downshifts of the gear ratios, which process permits improvement of vehicle driving comfort and safety, by acting on the braking or acceleration capacity of an automatic transmission vehicle.

In most methods for control of gear ratio changes in automatic mode, the gear ratio changes are authorized as a function of vehicle speed and engine load. Most often, these criteria are translated in the form of gear ratio change laws, which are conveniently visualized in a $V_{veh}/\alpha_{pap}$ graph, where Vveh denotes the vehicle speed and αpap the throttle opening angle, or more generally the opening of the device for regulation of admission of fuel to the engine.

A known example of gear ratio change laws is proposed in FIG. 1, in which curves 1 and 3 respectively represent the curves of downshift from N to N−1 and from N−1 to N−2, and curve 2 represents the curve of upshift from N−1 to N, where N is the current gear ratio.

As will become apparent hereinafter, the known processes for control of gear ratio changes of automatic gearboxes with multi-stage gear ratios exhibit disadvantages when it is desired to reduce the gear ratios, both in the case of braking and in that of acceleration.

The problem of braking assistance during downshifts will be discussed first of all with reference to FIGS. 1 to 3, and especially to FIG. 1. Let us suppose that the driver is traveling at stabilized speed in fourth gear (assuming that N=4) and that, for some reason, he is forced to slow his vehicle substantially by braking. Downshifts will of course be executed, but in the following manner: starting from point A (speed stabilized in gear ratio N=4), the driver will progressively release the accelerator in order to then brake. He will then pass from A to B, still in the same gear ratio N=4. Since he is braking, the vehicle speed will drop and the current point will successively intersect downshift curves 1 and 3 at points C and D. The downshift from N to N−1 takes place at C and the second downshift from N−1 to N−2 (which in the example chosen is from third to second gear) takes place at D.

This analysis shows clearly that the downshifts will invariably take place at points C and D, regardless of braking intensity, regardless of traveling conditions (downhill, level) and regardless of the driver's driving style. As it happens, this situation is not that desired by the driver, as is clearly shown by the driving manner of a driver who decides to change gear ratio in a manual gearbox vehicle, where the gear ratio changes may be made under highly variable conditions. Of course, the driver driving a vehicle equipped with an automatic gearbox still has the option of downshifting as desired by acting on the gearstick, but in this case the "automatic" performance is lost.

SUMMARY OF THE INVENTION

A first objective of the present invention is therefore to provide a process for assisting braking by anticipatory downshifts of automatic transmissions with multi-stage gear ratios, which process can adapt the gear ratio change decisions in the phases of braking of the vehicle to a plurality of parameters and is capable of eliminating the disadvantages of the prior art.

Another objective of the invention related to the problem of braking assistance is to achieve supplementary engine braking of the vehicle, to downshift to a "good" gear ratio on entering a curve, and on the whole to add more driving comfort during vehicle deceleration phases.

According to another aspect, the invention relates to a process for control of downshift phases of automatic transmissions with multi-stage gear ratios, which process makes it possible to assure driving safety in the acceleration phase, for example while the vehicle is in passing situations or during traveling situations which necessitate a potential for hard acceleration.

This problem will be explained in greater detail with reference to FIG. 4. In this figure there is proposed an example of a gear ratio change law in which curves 4 and 5 respectively represent the curves of downshift from N to N−1 and from N−1 to N−2, where N is the current gear ratio of the transmission.

Let us suppose that the driver is traveling at stabilized speed in fourth gear (assuming that N=4), which therefore corresponds to point A in the αpap, Vveh graph described hereinabove. If for some reason of his own the driver wishes to accelerate strongly (to pass another vehicle, for example), he needs all available power to the wheels in order to achieve the maximum acceleration potential. Referring to FIG. 4, upon opening of the throttle, the current point in the αpap, Vveh graph will therefore travel along the segment oriented from A to D, successively intersecting the downshift curves 4 and 5. Gear ratio N−1 will be engaged at point B, and gear ratio N−2 will then be engaged by the transmission at point C. A sequence from N to N−1 and from N−1 to N−2 is therefore observed in the cascade of gear ratios. This sequence is not desired from the safety viewpoint, because it is well known for delaying the appearance of maximum power at the wheel: the time for executing the two gear ratio changes may be too long, and may last several seconds depending on the transmission.

Under this second aspect, an objective of the invention is therefore to provide a process for control of downshift phases, which process makes it possible, during certain actuations of the accelerator, to avoid the cascades of N to N−1 and from N−1 to N−2 which detract from vehicle safety, in such a way that downshifting from N to N−2 (skipping a gear ratio) is executed directly, thus instantaneously providing the maximum power to the motive wheels.

To solve the problems posed by downshifts under braking or acceleration conditions as explained hereinabove, the invention provides corresponding process for control of downshifts.

For control of braking events, the invention therefore relates to a process for control of downshifts of automatic transmissions, characterized in that it comprises:
  determining the conditions under which the downshift shifts from normal operation as a function of predetermined shift laws to a special downshift mode, and detecting the shift to the said special mode;
  in the event of detection of the shift to the special mode, downshifting by shifting from the current gear ratio (N) to a lower gear ratio, and disabling this lower gear ratio until disappearance of the special downshift mode.

According to other characteristics of the process, it is provided with the stages comprising:

a) to determine the conditions under which downshifting no longer takes place according to the normal automatic shift laws of the gearbox, but according to a special mode there is used a limit value (N_turb_max) for maximum speed of the torque converter turbine, below which the said special mode begins;

b) When during braking the turbine speed drops below the said limit value, an anticipatory downshift of one gear ratio is executed to shift from gear ratio N to gear ratio N−1, such that the anticipatory downshift participates in the braking effect.

preferably the limit value of turbine speed is determined in fuzzy logic, taking into account the vehicle deceleration representative of the braking intensity, the braking duration, a variable representative of the driver's driving style, and a variable representative of the highway gradient.

In addition, the distance traveled by the vehicle is calculated as soon as the vehicle deceleration reaches a certain predetermined level and, to exit from the special downshift mode, the current gear ratio is enabled either when the vehicle has traveled a certain predetermined distance with the opening ($\alpha$pap) of the device for regulation of admission of fuel to the engine having remained stable, or when the engine rpm becomes too high, or when the N/N−1 downshift curve is intersected, or even when the driver manually actuates the gearstick to select a higher gear ratio.

Secondly, in order to solve the problems posed by downshifts for the purposes of vehicle acceleration, the invention relates to a process for control of downshifts according to one of the preceding claims, and used for purposes of acceleration assistance, characterized in that it is provided with stages comprising:

a) at the intersection with a downshift curve, starting a first time delay (Ta) of short duration, during which the downshift is inhibited and the current gear ratio N is retained;

b) during the said first time delay (Ta), analyzing the stability of the accelerator or of the throttle angle ($\alpha$pap) as a function of time;

c) in the case of stability above a predetermined threshold, selecting the gear ratio which corresponds to the current point in the graph ($\alpha$pap, vehicle speed), otherwise starting a second time delay ($T_{unstable}$), during which the gear ratio N is still retained;

preferably, the second time delay ($T_{unstable}$) is maintained and the gear ratio N retained as long as the instability ($|\Delta\alpha_{pap}|$) lies between predetermined low and high thresholds of instability when the second time delay ($T_{unstable}$) has elapsed, the gear ratio corresponding to the current point in the cartographic graph ($\alpha$pap, Vveh) of gear ratio changes according to normal operation is selected.

preferably the disabling for instability of the throttle opening angle has priority over disabling resulting from the waiting time delay.

The invention also relates to an automatic transmission using the above process for control of gear ratio downshifts, as well as to a motor vehicle with automatic gearbox having multi-stage gear ratios, provided with such an automatic transmission.

The disadvantages of current downshift processes will be explained in more detail with reference to FIG. 4. If the driver while in fourth gear, for example, rapidly depresses the accelerator starting from point A, he will intersect the downshift curve 4. But since he has depressed the accelerator rapidly, downshifting is disabled and a time delay $T_{unstable}$ is started, and it will remain initialized as long as instability of $\alpha$pap is detected. Thus, when the current point stabilizes at point D, the gear ratio N−2 will be engaged and, by virtue of the invention, the sequence of N to N−1 and N−1 to N−2 will be avoided, thus ensuring safety during passing maneuvers as well as lively response of the transmission.

The invention also relates to an automatic transmission with multi-stage gear ratios using the process having the characteristics described hereinabove for control of downshifts, as well as to a vehicle incorporating such an automatic transmission.

BRIEF DESCRIPTION OF THE DRAWINGS

The invention will be better understood and other advantages of the invention will become clear upon reading the description hereinafter, given by way of nonlimitative example, and of the attached drawings, wherein:

FIG. 3 represents the table containing the fuzzy rules which permit calculation of the value N-turbine-max;

DESCRIPTION OF THE PREFERRED EMBODIMENTS

Figure 1:
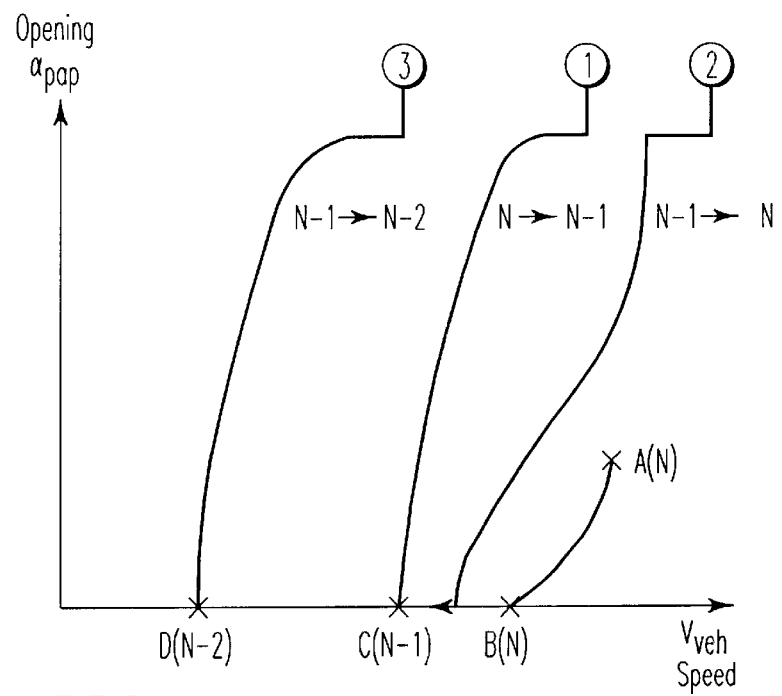
FIG. 1 represents, in the $\alpha$pap/Vveh graph, a characteristic cycle of the problem of non-assistance during braking of automatic transmissions controlled by the standard shift graphs.
Figure 2:
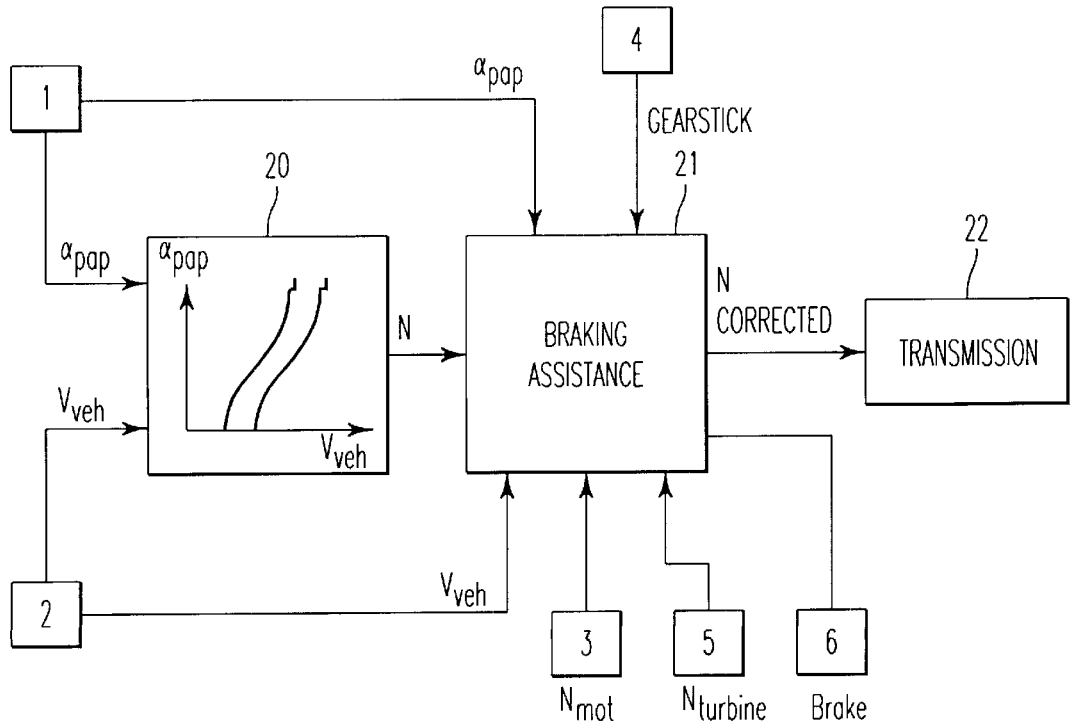
FIG. 2 represents a partial schematic view of a motor vehicle using the fuzzy-logic process according to the invention for braking assistance.
Figure 4:
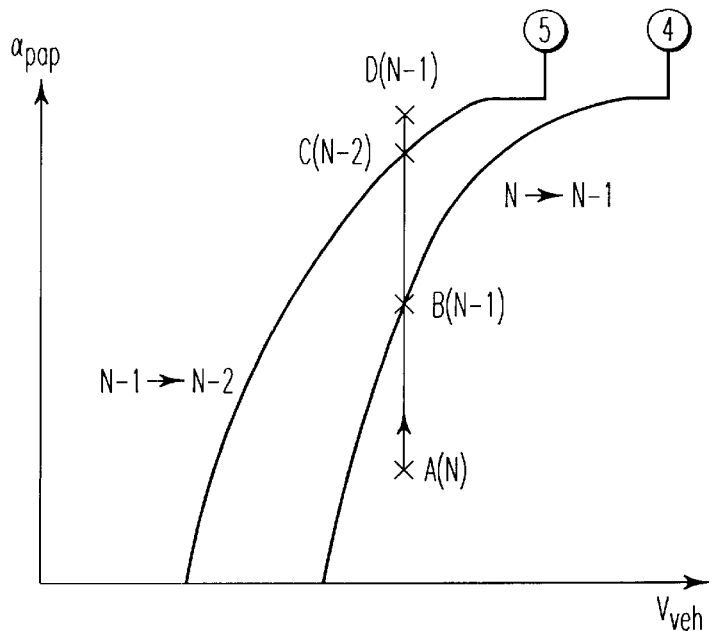
FIG. 4 represents, in a graph of the gas throttle opening angle as a function of vehicle speed, a characteristic cycle of the problem of the cascade of downshifts during rapid depressions of the accelerator.

The process for control of downshifts for purposes of braking assistance will be explained in more detail with reference to FIG. 2. Functional block 20 uses a cartographic or possibly other gear ratio control method to determine, in a manner known in itself, from the throttle opening signal $\alpha$pap transmitted from sensors 1 associated with the engine and from the vehicle speed signal $V_{veh}$ transmitted from sensor 2 associated with the vehicle, a proposal for the gear ratio N. This proposal for the gear ratio N is submitted to the braking assistance process, indicated schematically by block 21. From this latter there is posted a setpoint corrected gear ratio N, which is effectively applied to transmission 22. The corrected gear ratio N is determined as a function of the gear ratio N transmitted from block 20 and the signals $\alpha$pap, $V_{veh}$ (transmitted from sensors 1 and 2), $N_{mot}$, which is the engine rpm transmitted from sensor 3, N-turbine, which is the rpm of the converter turbine, transmitted from sensor 5, of the position of gear selector lever 4, and of the brake contact transmitted from sensor 6.

It will be noted that turbine speed sensor 5 is not absolutely necessary, because N-turbine could easily be recalculated from the vehicle speed and from the current transmission ratio.

The anticipatory downshift process according to the present invention can be achieved in the form of a function which has entry conditions, actions and exit conditions. For the present application, the conditions for entry into the function which generate braking assistance by anticipatory downshifts are the following:

the gearstick position is such that the gear ratios are authorized automatically (generally known as the "drive" position in English terminology);

N-turbine<N-turbine-max, a condition which signifies that the turbine rpm has become too low in view of the driving situation (need for engine brake);

the driver applies the brakes (active brake contact).

When these conditions exist simultaneously, the function requires the transmission to downshift by one gear ratio (shifting to corrected N=N−1). When the downshift has been executed and the entry conditions hereinabove remain valid, a second downshift may be authorized (corrected N=N−2). N-turbine-max is therefore a maximum threshold of turbine speed which is determined in fuzzy logic from the following signals:

1. of the vehicle deceleration $\gamma_{veh}$ obtained by differentiation and filtering of the vehicle speed $V_{veh}$,
2. of the braking time, which is incremented from the value zero as soon as the brake contact is activated, abbreviated "time-braking",
3. of the highway gradient, which in classical manner- is determined by the following formula:

$$\text{force-}DIF = F_{mot} - F_{resistant} - M \cdot \gamma_{veh},$$

where:

$F_{mot}$ is the motive power to the wheels $F_{resistant}$ is the combination of forces resisting forward movement (aerodynamic and rolling resistance), M is the empty vehicle weight, force-DIF will become successively zero on a level highway and with the vehicle unloaded, positive on an uphill highway or with the vehicle loaded, negative on a downhill highway.

4. Finally, the variable N_Turbine_max also depends on a classifying variable representative of the driver's driving style, which can be obtained by a method described in particular in the patent 93 E 1076 DE. It may be noted that this variable is PRG-driver (or driver program) which, for example, classifies the driver's driving style into three zones defined as ECO (economic), MEDIUM (normal) or sport, which correspond respectively to economic, normal or sporty driving styles of the driver.

By way of indication, the fuzzy rules used for determination of the maximum turbine speed threshold N-turbine-max are described in the table of FIG. 3. These rules represent only one practical example. The choice of fuzzy rules is derived from development experience.

Referring to FIG. 3, this table expresses the fuzzy conclusion of the fuzzy-logic determination of N_turbine_max as a function of all the entry parameters. As an example, it signifies for the circled box indicated by A that, if (Prg_Driver is MEDIUM) and if (Force_dif is Negative) and if (γveh is Medium) and if (time_braking is Medium), then the speed N_turb_max is Medium.

When the downshift of a gear ratio is authorized (conditions for entry into the function have been validated), the gear ratio is maintained. Exit from this situation is determined by exit conditions as hereinafter. Exit from the braking assistance function will take place if one of the following conditions becomes valid:

$N_{mot} \geq$ threshold-$N_{mot}$-high, indicating engine overspeed, or the driver actuates the gearstick to obtain a higher gear ratio, or the curve of downshift from corrected N+1 to corrected N is intersected, or the vehicle has traveled a certain distance.

The distance is calculated from the vehicle speed by integration as soon as the vehicle is traveling at constant speed or is reaccelerating.

Figure 5:
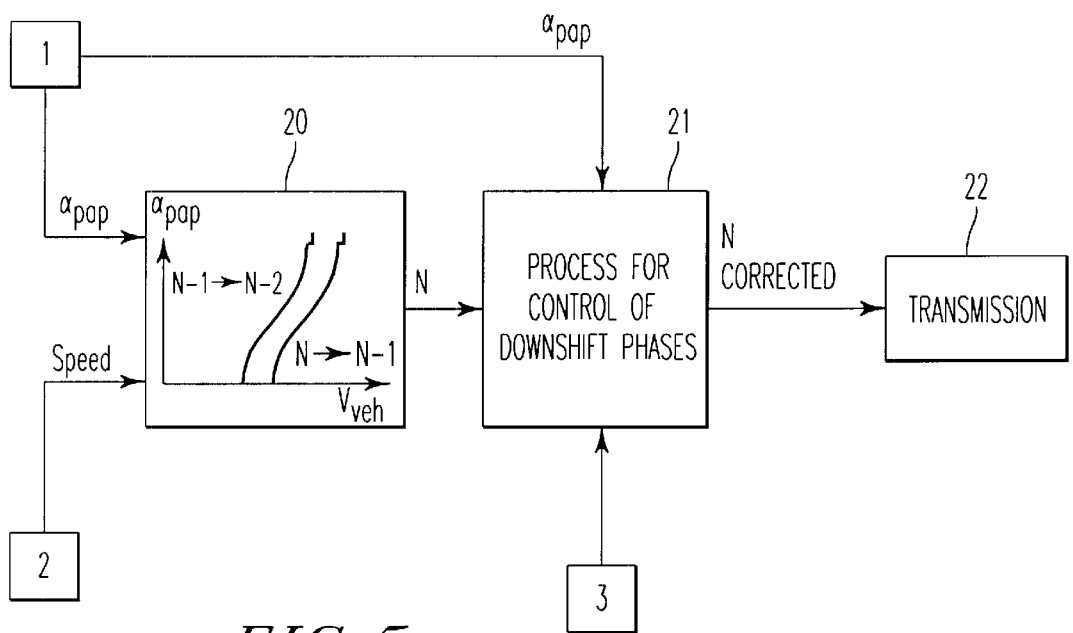
FIG. 5 represents a partial schematic view of a motor vehicle using the process according to the invention for control of downshifts during the acceleration phase.

The process for control of downshifts for acceleration purposes will now be explained in more detail with reference to FIG. 5. Functional block 20 uses a known cartographic method to determine, in the $\alpha_{pap}/V_{veh}$ graph, from the signal $\alpha_{pap}$ transmitted from sensor 1 associated with the engine and from the vehicle speed signal Vveh transmitted from sensor 2, the gear ratio N that it would have to apply to the automatic transmission represented schematically by block 22. The process for control of downshift phases makes it possible temporarily to disable the gear ratio N, and to do so taking into account the additional "kick down" signal transmitted from sensor 3. This same device 21 determines a proposition for the corrected gear ratio N, which is then effectively applied to transmission 22.

According to one of the characteristics of the present invention, the process for control of downshift phases for acceleration purposes is provided with the following two functions:

F1: disabling by waiting time delay,

F2: disabling resulting from instability of throttle opening angle $\alpha_{pap}$.

The function F2 has priority over the function F1. F1 comprises, when F2 is not active and when a downshift is demanded by the shift laws, and if "kick down" is not active, inhibiting the downshift for the time delay $T_a$.

Exit from F1 can take place:

if F2 is activated, and entry into F2 takes place, or if kick down is activated, or if the time delay Ta has ended, or if the demand for downshift by the shift laws disappears.

The purpose of this function F1 is to delay slightly the lower gear ratio at the intersection with the downshift curve from N to N−1 in order to analyze the conditions for entry into the function F2, thus leading to disabling the downshift as long as the throttle angle remains unstable.

F2 comprises inhibiting the lower gear ratio for a time delay $T_{unstable}$ when the following conditions exist simultaneously:

the lower gear ratio is demanded by the shift laws, and $|\Delta\alpha_{pap}|>$threshold-high, and "kick down" is not activated.

$|\Delta\alpha_{pap}|$ represents the variation of throttle angle, calculated by simple differentiation: $\Delta\alpha_{pap} = \alpha_{pap}(t) - \alpha_{pap}(t-T_e)$, where t is the current instant and $T_e$ the sampling period, which must be short. Threshold-high is an adjustable activation threshold, below which the variation of throttle angle triggers the function F2.

The time delay is initialized or reinitialized when: a new downshift curve is intersected, or when $|\Delta\alpha pap|>$threshold-high. It is maintained at its most recent value when:

$$\text{threshold-low}<|\Delta\alpha_{pap}|>\text{threshold-high}.$$

It is decremented when $|\Delta\alpha_{pap}| \leq$threshold-low. Thus this concept of hysteresis and reinitialization ensures that the gear ratio will remain well disabled as long as $\alpha_{pap}$ remains unstable, with an instability between a low limit and a high limit. In this way, this procedure will be vigorous with respect to possible measuring noise on the signal $\alpha_{pap}$.

Exit from F2 can take place if:

the demand for downshift by the laws disappears, or if the time delay $T_{unstable}$ disappears, or if kick down is activated.

At the end of a function F1 or F2, the ratio to be applied to transmission 22 will be that demanded by the shift laws, or in other words n.

What is claimed is:

1. A process for control of downshifts of automatic transmissions, comprising:

determining the conditions under which the downshift shifts from normal operation as a function of predetermined shift laws to a special downshift mode, and detecting the shift to the said special mode;

in the event of detection of the shift to the special mode, downshifting by shifting from a current gear ratio (N) to a lower gear ratio, and disabling this lower gear ratio until disappearance of the special downshift mode, characterized in that the special mode begins when the maximum speed of a torque converter turbine drops below a limit value (N_turb_max), and in that an anticipatory downshift from gear ratio N to gear ratio N−1 is executed to assist braking when a turbine speed drops below the said limit value in the braking situation.

2. A process according to claim 1, characterized in that the said limit value (N_turb_max) of turbine speed is determined in fuzzy logic, taking into account:

vehicle deceleration representative of braking intensity, braking duration, a variable (PRG_Driver) representative of the driver's driving style, and a variable representative of highway gradient.

3. A process for control according to claim 2, characterized in that distance traveled by the vehicle is calculated as soon as the vehicle deceleration reaches a certain predetermined level and, to exit from the special downshift mode, the current gear ratio is enabled either:

when the vehicle has traveled a certain predetermined distance with the opening ($_{pap}$) of a device for regulation of admission of fuel to the engine having remained stable, or when the engine rpm becomes too high, or when the N/N−1 downshift curve is intersected, or when a driver manually actuates the gearstick to select a higher gear ratio.

4. A process for control of downshifts according to claim 1, and used for purposes of acceleration assistance, characterized in that it is provided with stages comprising:

a) at the intersection with a downshift curve, starting a first time delay ($T_a$) of short duration, during which the downshift is inhibited and the current gear ratio N is retained;

b) during the said first time delay ($T_a$), analyzing the stability of the accelerator or of the throttle angle ($\alpha_{pap}$) as a function of time;

c) in the case of stability above a predetermined threshold, selecting the gear ratio which corresponds to the current point in the graph ($\alpha_{pap}$, vehicle speed), or otherwise starting a second time delay ($T_{unstable}$), during which the gear ratio N is still retained.

5. A process for control according to claim 4, characterized in that the second time delay ($T_{unstable}$) is maintained and the gear ratio N retained as long as the instability ($|\Delta\alpha_{pap}|$) lies between predetermined low and high thresholds of instability.

6. A process for control according to claim 4, characterized in that, when the second time delay ($T_{unstable}$) has elapsed, there is selected the gear ratio corresponding to the current point in the cartographic graph ($\alpha_{pap}$, $V_{veh}$) of gear ratio changes according to normal operation.

7. A process for control according to one of claim 4, characterized in that the disabling for instability of the throttle opening angle has priority over disabling resulting from the waiting time delay.

8. An automatic transmission, characterized in that it uses the process of claim 1 for control of downshifts of gear ratios.

9. A motor vehicle with automatic gearbox having multistage gear ratios, characterized in that it is provided with an automatic transmission according to claim 8.

* * * * *